3,239,484
STABILIZATION OF POLYOLEFINS WITH OXANILIDE AND A CROTONALDEHYDE-PHENOL CONDENSATION PRODUCT

Atmar R. Stark, Baytown, Tex., assignor, by mesne assignments, to Esso Research and Engineering Company, Elizabeth, N.J., a corporation of Delaware
No Drawing. Filed Oct. 4, 1962, Ser. No. 228,232
6 Claims. (Cl. 260—45.9)

The present invention is directed to a stabilizer system for polyolefins. More particularly, the invention is concerned with a synergistic stabilizer mixture which is incorporated in polyolefins such as polypropylene. In its more specific aspects, the invention is concerned with a polypropylene composition of the synergistic stabilizer mixture incorporated therein which resists oxidative degradation when in the presence of metals such as copper and the like.

The present invention may be briefly described as a stabilizer system for polyolefins which consists essentially of a synergistic mixture of a condensation product of 3 mols of 3-methyl-6-t-butyl phenol with 1 mol of crotonaldehyde and oxanilide (N,N'-diphenyloxanide). The present invention may be further described as compositions of matter which contain a major amount of a solid polyolefin and a minor amount of the synergistic mixture of the present invention.

The problems of stability of polyolefins are well known. Further it is known that polyolefins are unstable when in contact with metal, especially copper. Other metals such as titanium, iron, nickel and the like are known to be deleterious to polyolefins. The present invention is involved with a synergistic mixture which has a markedly superior oxidation inhibiting effect when incorporated in polyolefins which are subjected to contact with metals. Accordingly, polymers of polyolefins having the synergistic mixture of the present invention incorporated therein may be used in such applications as coating copper wire, coating or wrapping cables or in any use where the polymer is in contact with a metal. The present invention also has application where the metals are present in the polyolefins in trace amounts. When the metals are present as contaminants such as catalyst residues, they are present in amounts from about 0.001 to about 0.02 weight percent.

The condensation product used as part of the synergistic mixture of the present invention is made by the condensation reaction of 3 mols of 3-methyl-6-t-butyl phenol with 1 mol of crotonaldehyde in the presence of an acid catalyst. The condensation product is a mixture which has compounds of the following chemical structures therein:

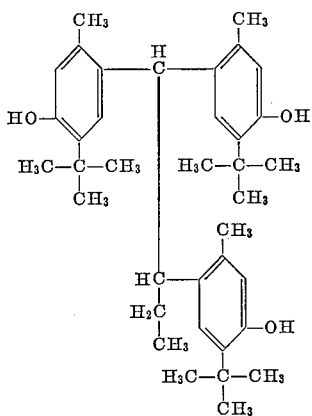

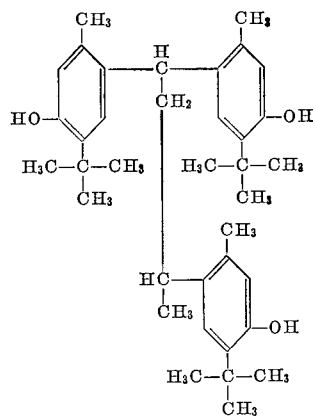

The synergistic mixture of the present invention is made up of about 4:1 to about 1:1.5 of oxanilide to the condensation product. A preferred synergistic mixture consists of mixing the solid oxanilide with the solid condensation product in a ratio of about 2:1 to about 1:1. The synergistic mixture of the present invention is incorporated into solid polyolefins in an amount from about 0.1 to about 1.5 weight percent. Preferably the synergistic mixture is added to the polymer in an amount less than 1 percent by weight and preferably is added in an amount from about 0.25 to 1.0 weight percent. The synergistic material may be incorporated in the polyolefin by forming a solution thereof in a suitable solvent such as an aromatic hydrocarbon. Suitable solvents may be illustrated by xylenne, hexane, or cyclohexane. The synergistic mixture may be sprayed over the pellets or particles of the polyolefin and the resulting mixture may then be extruded through a suitable extrusion device to cause the formation of a homogeneous mixture. The synergistic mixture may also be added to the polymer particles in a dry form and the resulting mixture subjected to milling, extrusion, or some other process to cause intimate mixture of the synergistic mixture with the polymer composition.

The polymers of polyolefins may be treated by the addition of other stabilizers or antioxidants other than the synergistic mixture of the present invention. The synergistic mixture of the present invention has been found to give oxidative stability to stabilized polymers when in the presence of a metal which the other stabilizers or antioxidants were unable to obtain. Accordingly, the polymers treated according to the present invention may have been previously treated, may be simultaneously treated or may be treated after the addition of the synergistic mixture of the present invention by the addition of other known stabilizers and antioxidants. Other known antioxidants are illustrated by dilauryl-thiodipropionate, dipinene-diphenol, 2,6-ditertiary butyl-4-methyl phenol and other phenolic antioxidants. Further to improve the color of the polymers, such material as zinc-2-ethylhexanoate, calcium carbonate, calcium stearate, and the like, may be incorporated in the polymer.

The polyolefin polymers which are treated with the synergistic mixture of the present invention are exemplified by polymers of alpha olefins having 2 to 8 carbon atoms in the molecule and may be illustrated by polyethylene, polypropylene, ethylene-propylene copolymers, ethylene-butene-1 copolymers, ethylene-pentene-1 copolymers, and the like, with molecular weights in the range from about 10,000 to 1,000,000. These polymers are produced by polymerization of the corresponding olefins employing the Ziegler type polymerization catalyst which is obtained by at least partially reducing in solution in a diluent a halide of an amphoteric metal selected from Groups IVB, VB, VIB, and VIII of the Periodic System of Elements (see, for example, the Henry D. Hubbard Periodic Chart of the Elements, 1947 ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, an amphoteric metal halide is reduced in solution in a nonreactive, nonpolar organic diluent in any suitable manner such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and at least partialy reduced amphoteric metal halide, is employed as the medium in which olefin polymerization is effected.

The diluent to be employed should be nonreactive, nonpolar organic medium in which the amphoteric metal halide starting material is soluble to an extent at least sufficient to provide on 0.1 weight percent solution of amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, isomers thereof, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzent, dichlorobenzene, etc.), gas oil distillate fractions obtained from the catalytic cracking of virgin gas oil feed stocks, Diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about −60° to about 400° F., preferably at about room temperature. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are usually required, although reaction time may vary within the range of about 10 minutes to about 24 hours.

The olefin polymers of the type described and illustrated herein are produced by a catalyst of the nature described having molecular weights as recited which are essentially insoluble in the non-polar organic liquid and form a slurry of polymerized olefins therein.

These polymers are suitably quenched by adding alcohol such as methyl alcohol thereto to deactivate any catalyst and additional amounts of methyl alcohol to precipitate the insoluble polymers from the resulting slurry. The polymer particles are separated and recovered from the slurry and are then treated by adding to them the synergistic mixtures of the present invention.

The present invention will be further illustrated by the following data which are given by way of illustration and not by limitations on the scope of the present invention.

The synergistic mixture of the present invention was tested by mixing the mixture with four separate batches of dry stabilizer polypropylene pellets and extruding the resulting mixtures. The stabilized polypropylene mixtures were then formed in films to form test pads of about 5 mils thickness. These test pads were then used as samples in the Bell Telephone oxygen uptake procedure for obtaining oxidation rates. This accelerated oxygen uptake test is reported in the Journal of Applied Polymer Science, volume 1, issue No. 1, pages 37 to 42 (1959), in an article entitled "Effect of Carbon Black on Thermal Antioxidants for Polyethylene," by W. H. Hawkins, R. H. Hansen, W. Matreyek and F. H. Winslow. This oxygen uptake or adsorption test as reported was modified in that a fine mesh (100 to 150) copper screen was laminated between two 5 mil sheets of polymer and the test carried out at 150° C. (302° F.) rather than 140° C. The copper-polymer samples were cut in about ⅛ inch test strips and enough strips were used such that each sample contained about 0.1 gram of polymer. The stabilized polymer having the synergistic mixture of the present invention incorporated therein was also tested by placing about 5 grams of the polypropylene stabilized pellets in a U-tube in contact with a freshly cleaned copper wire. Air was passed over the stabilized pellets at a temperature of 302° F. (150° C.) until degradation of the polymer took place. The results of the accelerated oxidation test on polypropylene having the synergistic mixture of the present invention incorporated therein utilizing both oxidative stability test is set forth in Table I:

*Table I*

| Sample | Oxidation Test, Time to Breakdown, Hrs. | |
|---|---|---|
| | U-Tube, Air 302° F.[a] | Bell Closed System, O₂ 302° F.[a] |
| Polypropylene (plus 12% Polyisobutylene) | | <1 | <1 |
| Sample No. 1: | | |
| +.54% Oxanilide[b] | | 22 | 19 |
| +.50% Condensation product[b] | | 7 | 8 |
| +.25% Oxanilide +.25% Condensation product[b] | | 32½ | 30½ |
| Polypropylene | | <1 | <1 |
| Sample No. 2: | | |
| +.5% Oxanilide | 288 | 41½ | 38½ |
| +.5% Condensation product[b] | | 6⅓ | 9½ |
| +.25% Oxanilide +.25% Condensation product[b] | 762 | 56½ | 52 |
| +.125% Oxanilide +.125% Condensation product[b] | 762 | 54¾ | |
| Polypropylene | | <1 | <1 |
| Sample No. 3: | | |
| +.5% Oxanilide | | 38 | 35¼ |
| +.8% Oxanilide | | 42½ | 43 |
| +.25% Oxanilide +.25% Condensation product[b] | | 57½ | 60 |
| Polypropylene | | <1 | <1 |
| Sample No. 4: | | |
| +.5% Oxanilide | 384 | 29½ | 26½ |
| +.5% Condensation product[b] | | 6 | 5¾ |
| +.25% Oxanilide +.25% Condensation product[b] | 738 | 54 | 58 |

[a] Samples tested in presence of freshly cleaned copper wire.
[b] Condensation product of 3 mols of 3-methyl-6-t-butyl phenol with 1 mol of crotonaldehyde.

As can be seen in the results of Table I, the synergistic mixture of the present invention stabilizes polypropylene in the presence of copper. The use of copper is significant since its effect on polyolefins is the most severe.

The nature and objects of the present invention having been completely described and illustrated and the best mode thereof set forth, what I wish to claim as new and useful and secure by Letters Patent is:

1. A stabilizer system for polyolefins comprising a synergistic mixture of (1) the condensation product of (A) 3 mols of 3-methyl-6-t-butyl phenol with (B) 1 mol of crotonaldehyde and (2) oxanilide in the ratio of about 4:1 to about 1:1.5 of oxanilide to said condensation product.

2. A stabilizer system in accordance with claim 1 wherein said synergistic mixture consists of about 2:1 to about 1:1 oxanilide to said condensation product.

3. A composition comprising a polymer of an alpha-olefin having 2 to 8 carbon atoms in the molecule and a stabilizing amount of a synergistic mixture comprising (1) the condensation product of (A) 3 mols of 3-methyl-6-t-butyl phenol with (B) 1 mol of crotonaldehyde and (2) oxanilide in the ratio of about 4:1 to about 1:1.5 of oxanilide to said condensation product.

4. A composition of claim 3 wherein said polymer is polypropylene.

5. A composition of claim 4 wherein said synergistic mixture is present in an amount less than 1.0 percent by weight.

6. A composition comprising 99.5% polypropylene and 0.5% of a mixture consisting of (1) one part of oxanilide and (2) one part of the condensation product of (A) 3 moles of 3-methyl-6-t-butyl phenol and (B) 1 mole of crotonaldehyde.

References Cited by the Examiner
UNITED STATES PATENTS 2,972,596   2/1961   Newland et al. _____ 260—45.9

LEON J. BERCOVITZ, *Primary Examiner.*